United States Patent

Carruthers

[11] Patent Number: 4,627,470
[45] Date of Patent: Dec. 9, 1986

[54] SEALING DUCTS

[75] Inventor: Alec R. Carruthers, Nr. Westbury, England

[73] Assignee: ALH Systems Limited, Westbury, England

[21] Appl. No.: 616,158

[22] Filed: Jun. 1, 1984

[30] Foreign Application Priority Data

Jun. 2, 1983 [GB] United Kingdom ............... 8315198

[51] Int. Cl.$^4$ ............................................. F16L 55/12
[52] U.S. Cl. ......................................... 138/93; 383/3; 383/126; 383/115; 383/117
[58] Field of Search .............. 244/31; 251/DIG. 2, 251/61.1; 53/480; 383/907, 908, 121, 125, 126, 117, 3, 115, 114; 138/93, 94, 91

[56] References Cited

U.S. PATENT DOCUMENTS

| | | | |
|---|---|---|---|
| 614,749 | 11/1898 | Pallas | 138/93 |
| 827,835 | 8/1906 | White | 138/93 |
| 1,760,750 | 5/1930 | Goodman | 138/93 |
| 1,791,178 | 2/1931 | Walter | 383/908 X |
| 1,922,003 | 8/1933 | Shuman | 138/93 |
| 2,539,390 | 1/1951 | Almgren et al. | 53/480 |
| 2,639,750 | 5/1953 | Phane | 383/3 X |
| 2,678,666 | 5/1954 | Theis et al. | 138/93 |
| 2,781,051 | 2/1957 | Hawley | 251/61.1 X |
| 2,857,933 | 10/1958 | Lithun | 138/93 |
| 2,865,419 | 12/1958 | Cunningham | 383/908 X |
| 3,357,193 | 12/1967 | Fitzgibbon | 138/93 X |
| 3,842,864 | 10/1974 | Riegel et al. | 138/93 |
| 4,079,755 | 3/1978 | Van der Lans | 138/93 |
| 4,185,806 | 1/1980 | Dremann | 251/61.1 |
| 4,203,473 | 5/1980 | Roberson, Sr. | 138/94 X |
| 4,291,727 | 9/1981 | Yie et al. | 138/94 X |

FOREIGN PATENT DOCUMENTS

| | | | |
|---|---|---|---|
| 2641196 | 3/1978 | Fed. Rep. of Germany | 251/61.1 |
| 2801605 | 7/1978 | Fed. Rep. of Germany | 251/61.1 |
| 2712952 | 9/1978 | Fed. Rep. of Germany | 138/93 |
| 13447 | of 1898 | United Kingdom | 138/93 |
| 22591 | of 1898 | United Kingdom | 138/93 |
| 188695 | 11/1922 | United Kingdom | 138/93 |
| 412676 | 7/1934 | United Kingdom | 138/93 |
| 1311017 | 3/1973 | United Kingdom | 138/94 |

Primary Examiner—Larry Jones
Assistant Examiner—Carl D. Price
Attorney, Agent, or Firm—Larson and Taylor

[57] ABSTRACT

In an iris-stop arrangement for stopping-off a duct the secondary bag has a contact length with the duct of at least 0.7 times its diameter. The apparatus is such that the point where the inflation neck of the bag meets the remainder of the bag can adopt a position not substantially in front of the secondary bag support member. Thus the bag has improved functional grip on the duct and does not suffer severe flexing at the neck when it moves back to rest against the support member. Preferably the portion of the bag which contacts the duct in use is a single layer of fabric thick while the ends of the bag, which have to withstand the bag inflation pressure unsupported, are two layers thick. In this way the bag can have good performance characteristics while only needing a relatively small insertion hole in the side of the duct.

7 Claims, 14 Drawing Figures

SEALING DUCTS

BACKGROUND OF THE INVENTION

1. Field of the Invention

This invention relates to sealing ("stopping-off") ducts or pipes for example during repair of maintenance operations. The most common example of a duct or pipe on which this is done is a distribution duct for main gas supplies.

We are primarily concerned in this invention with the stopping-off of large ducts, say up to about 120 cm diameter, where the pressure to be resisted may be comparatively high, perhaps up to about 2 bar.

2. Description of the Prior Art

To stop-off systems which are working at that sort of pressure, primary sealing is achieved by a so-called iris-stop system. In this, an expansible disc is introduced into the duct through a hole in its wall and opened out to occupy most of its cross-section. A so-called primary bag is introduced into the duct at the upstream side of the disc. Once it is positioned inside the duct it is inflated and thereby forms a seal across the duct. The end of the bag remote from its point of inflation is supported by the disc. This therefore both prevents sliding of the bag along the duct under the high pressure encountered and reduces the general stresses on the primary bag.

A secondary bag is introduced into the duct downstream of the primary bag. The secondary bag acts as a further seal for gas seeping past the first bag. It is also desirable for the secondary bag to act as a safety device, maintaining the seal on the duct if the primary bag fails. The secondary bags currently in use do not perform this back-up safety function very well. Because it is a back-up system the secondary bag has to be designed to meet pressure differentials greater than those which were withstood by the primary system and to meet them in conditions where there has been a sudden collapse of the primary bag, which can result in a substantial shock effect. Because it has to meet anticipated higher pressures it will itself have to be inflated to substantial pressures if it is to seal effectively and so it will, even while the primary bag is still acting, be subjected to considerable stress.

In order to provide some support for the secondary bag, a support member (usually a steel tube) is inserted into the duct through the same hole as is used for insertion of the bag. The support member is placed downstream of the bag. The bag is normally inflated through its downstream end, and the pipe carrying the inflation fluid normally runs from the hole in the duct to the inflation point on the bag through the support member. This support member is much less effective than the iris disc supporting the primary bag, but it is a much simpler structure and does not require a separate insertion hole in the duct, while providing at least a degree of support for the secondary bag. The inflation fluid is in practice always compressed air or another gas, nitrogen is often used.

SUMMARY OF THE INVENTION

We have identified one problem with existing secondary bags as a danger that dislodgement of the bag along the duct by shock or pressure may, if it goes over too great a distance, unduly stress the bag in the region of its inflation connection which is mechanically fixed in relation to the duct because the inflation pipe is held by the support tube.

In particular, the bag usually has a sleeve-like neck at this connection for egress of the mouth of an inflation bladder. The neck tends not to move, and as the remainder of bag moves the bag material may be flexed and bent back at the point where the neck joins the remainder of the bag. Accordingly in the present invention the length of the neck, the dimensions of the inflation pipe, the dimensions of the support member and their dispositions in use are such that if the bag moves until its downstream end presses against the support member, the point where the neck meets the remainder of the bag is not substantially upstream of the upstream side of the support member. In this way, the material cannot be bent back at this point when the bag slips, greatly reducing the risk of bag failure. If the support member is a tube, and the inflation pipe runs within the tube to the connection on the bag, then this condition can become that when the inflation pipe runs in contact with the inside of the support tube at its downstream side, the point where the neck meets the rest of the bag is not substantially upstream of the outside of the tube at its upstream side. Roughly speaking, this means that the length of the neck including its connector for the inflation pipe should be less than the diameter of the tube.

Although a support tube is currently used in practice, other support members are possible.

Another problem which we have identified is that it is not easy to provide the prior art bags with sufficient frictional grip against the duct, to avoid slippage. Accordingly we have increased the length to width ratio of the bag. In the prior art the length over which the inflated bag contacted the duct was about 0.5 of the bag diameter. According to the present invention the length is at least 0.7, preferably between 0.75 and 1.0, more preferably between 0.8 and 0.9 of the bag diameter. This increased length gives an increased contact area and therefore an increased frictional grip for a given contact pressure.

In practice very long bags are not highly advantageous. As the contact length to diameter ratio increases past 1 the bags become less practical, with 1.5 representing the practical limit in the present state of the art. The very long bags have a number of problems. First, the longer the bag the longer the section of duct which needs to be excavated, and the greater the spacing between the iris disc and the secondary support member. Second, it becomes difficult to arrange the uninflated bag correctly in the duct before inflation. Third, the longer bag takes longer to inflate and deflate, especially if it has a large diameter. Last, the preferred bag materials are available in fixed widths, currently of about 1 meter, and it may require more expensive tailoring to make long bags.

Usually a bag and to some degree it associated apparatus are designed to be used in blocking off a duct of a predetermined diameter against a fluid flow in the duct at a predetermined pressure. In order to grip the duct with sufficient force, we find that the pressure differential between the inflation fluid in the bag and the fluid in the pipe should be about 5 p.s.i. (about ⅓ bar). Therefore the bag should be inflated to a pressure of about 2⅓ bar if it is to block a duct against a fluid flow at 2 bar. However, since the bag is a secondary bag, it is not subjected to fluid pressure in the duct unless and until the primary system fails. Consequently the bag must be able to support the full differential pressure of 2⅓ bar. This will be called the operating pressure in the following discussion.

Current safety requirements include that the bag should be able to withstand inflation to four times its operating pressure. Therefore the bag discussed above must be able to withstand 9⅓ bar. If the bag is short, and has a small contact area, its frictional grip on the duct can be improved by inflating it to a higher pressure differential. However, in this case it becomes difficult to meet the safety requirements, as the maximum pressure to be withstood will increase by four times the increase the operating pressure. If the bag is made stronger, to meet this safety requirement then it will be bulkier when uninflated and thus require a bigger insertion hole in the side of the duct.

If a short bag is not inflated to a high pressure, but operated at a pressure giving reduced frictional grip on the duct, nothing adverse will happen for as long as the primary bag does not fail. If the primary bag fails, then the secondary bag is subjected to the full pressure of the fluid in the duct. It is also subjected initially to a shock. Further, the increase of applied pressure in the duct will tend to compress the inflation gas in the bag. At this moment the bag will tend to slip back, and also distort, pressing the downstream end against the support member. (This is the moment when the bag is stressed at the upstream end of the neck if it protrudes past the upstream side of the support member). All bags will tend to slip and distort at this moment, but if the bag's grip on the duct is insufficient it will move so far that the downstream end begins to wrap around the support member. This will pull away from the duct wall part of the duct-contacting surface of the bag. This surface consequently loses the support of the duct wall which it had previously enjoyed, and is therefore exposed to an increased risk of failure. Once again, this can be counter-acted by strengthening the bag, but this will tend to increase its uninflated bulk.

The features of the present invention discussed above are aimed at reducing stress, so that the bag can operate satisfactorily and meet the safety requirements without being disadvantageously bulky. Current conventional secondary bags are manufactured in double envelope form mainly because the outer skin acts as an anti-scuffing layer in the event of bag slip. In order to obtain double strength from the two layer construction the tailoring must be exact or one layer will experience greater stress than the other. The general elongation of the nylon material is some 15% maximum and thus a small inner can be supported by the outer if sizing is not too far out. If, however, the inner is larger than the outer only the outer skin is stressed. If this fails then the inner skin of the same material will also fail.

As mentioned above, the part of the bag which is in contact with the duct is substantially relieved of stress by the duct. However, the end faces of the bag must be able to withstand the full operating pressure. Therefore we prefer to make the ends of the bag stronger than the duct-contacting portion, avoiding unnecessary bulk in the latter. In fact, the unsupported parts of the bag are not all stressed to the same degree. The tension in a surface restraining a given pressure depends on the radius of curvature of that surface, the smaller the radius the less the tension. If the bag has a generally cylindrical shape, then at the point where the bag surface leaves the duct wall the stress is relatively low. It is highest over the centre of the end faces. Thus it does not matter if the stronger end surfaces do not reach quite to the wall of the duct.

Preferably the secondary stopping-off bag is constructed as a hollow cylinder of fabric with end closures constructed of a double layer of fabric the warps of the respective layers in a given end closure being at an angle to each other, the end closure being secured to the cylinder by means of folded-over end flaps of the layer. The angle between the warps of the layers in the end closures is optimally 90°. The sleeve-like neck in one end closure of the bag for egress of the mouth of the inflation bladder is made as short as possible and preferably also of a double layer of fabric, each layer having end flaps to be folded over and be secured to the end closures. The flaps radiate from the sleeve with end flaps originating from one layer of the neck being angularly offset from and overlapping the flaps originating from the other.

A seam of the cylinder is axial and is aligned to lie within the convergence of the warps of the layers of the end closures; furthermore when a gas connector is fitted to the neck it should be aligned generally with a continuation of the direction of the seam.

To minimise strength loss during stitching of the fabric it is desirable to use so-called "delta" needles, which have a rounded point and a triangular-section tip portion.

The invention also includes the method of making a secondary bag.

BRIEF DESCRIPTION OF THE DRAWINGS

A particular embodiment of the invention, given by way of example, will now be described with reference to the accompanying drawings in which.

DESCRIPTION OF THE PREFERRED EMBODIMENTS

Figure 1:
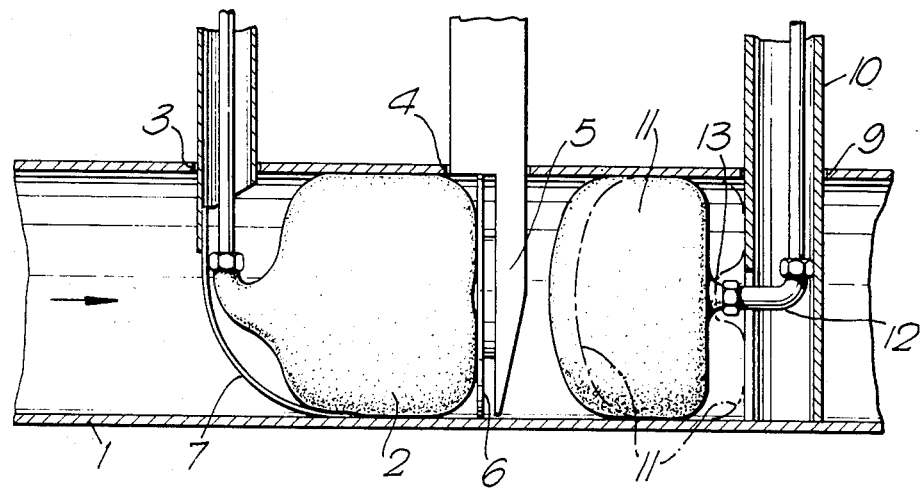
FIG. 1 shows the conventional layout of an iris-stop primary bag system and a secondary bag system in a duct, seen in cross-section.

Referring first to FIG. 1, a duct 1 of a mains gas pipe in which the gas flows from left to right is being temporarily stopped-off by a primary sealing bag 2 introduced by known means through a hole 3 formed in the wall of the duct. Downstream of the hole 3 a second hole 4 is formed, through which is introduced the support 5 of a spreadable iris-disc 6. The bag 2 having been guided to lie downstream of its insertion position by a skid 7, can be inflated to occupy the duct with its base resting against the iris-disc 6. Downstream of the iris-disc a further hole 9 is formed and a secondary bag (which here is a conventional secondary bag 11) is introduced through it and positioned in the duct upstream of it. A hollow support column 10 is also introduced through the hole 9 and positioned downstream of the secondary bag 11. The secondary bag is inflated through a gas connector 12 connected to a neck 13 of the bag. As can be seen the total length of the gas connector 12 and the neck 13 is greater than the cross-sectional width of the hollow column 10 so that when the bag 11 is inflated its rear end is substantially spaced out from the column. If, however, the primary bag were to fail the secondary bag might be forced back down the duct towards the position shown in dotted lines 11' at which it can be seen that its rear end closure is substantially flexed and stressed around the neck. The secondary bag 11 contacts the duct over a length which is about one half of the duct diameter.

Figure 2:
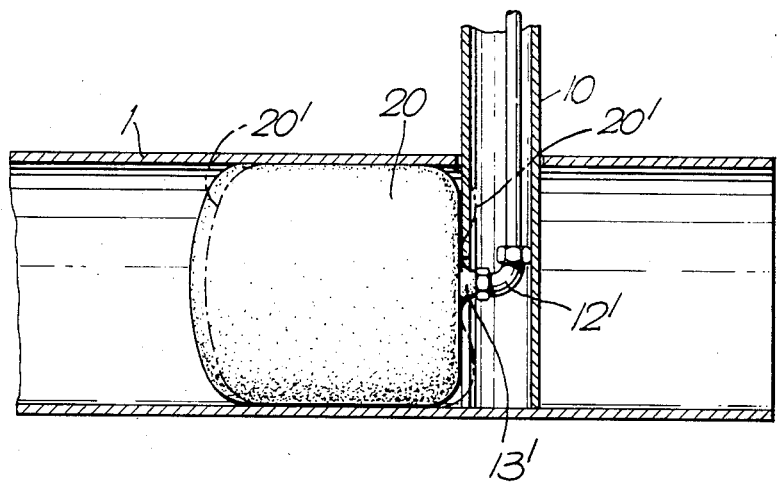
FIG. 2 shows the secondary bag embodying the present invention in position in the duct.

FIG. 2 shows a bag 20 embodying the invention in use. The column 10 may be identical but the total length of the connector 12' and neck 13' is not greater than the cross-sectional dimension of the column. Thus in a normal position shown in full lines the rear end of the bag 20 is supported by the column. This secondary bag 20 contacts the duct over a length which is at least 0.7 times the duct diameter, preferably between 0.8 and 0.9 times the duct diameter. As compared with the conventional bag 11 the increased contact length makes the bag 20 less likely to slip along the duct. Even if it is somewhat dislodged by sudden pressure, to the position 20', there is substantially less flexion and stress in the region of the neck (slight overlapping past the column 10 is possible but only beyond each side of the column).

The bag 20 embodying the invention is made up as follows.

A neck portion of the bag is made up as seen in FIG. 3. Two parts 23 and 24 each having a plurality of tongues 25 and 26 at one of their edges are placed so that the tongues are in staggered relationship and are tacked together by a line of stitching 27, FIG. 3a. They are then brought around as shown in FIG. 3b and seamed along one edge as far as the line of the root of the tongues. This seam 28 results in the formation of the sleeve portion 29. This sleeve is pushed through a central aperture in a planar annulus 30 of fabric seen in FIG. 3d and the tongues 25, 26 are turned outwardly from the sleeve to be radiated upon the face of the annulus 30 and are then stitched down onto that by a circular row of stitching 31. The placing of a cylindrical former inside the sleeve portion 29 as this is being done, is helpful.

Figure 3A:
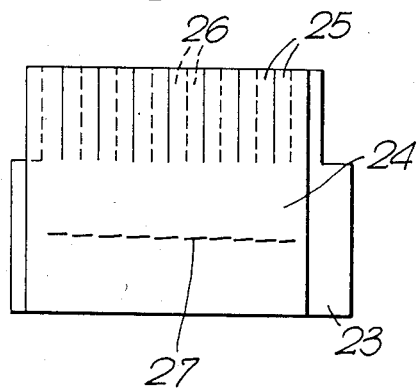
FIGS. 3a, 3b, 3c, 3d and 3e show various stages in the formation of a neck piece of the present bag.
Figure 3B:
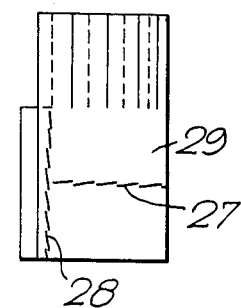
Figure 3C:
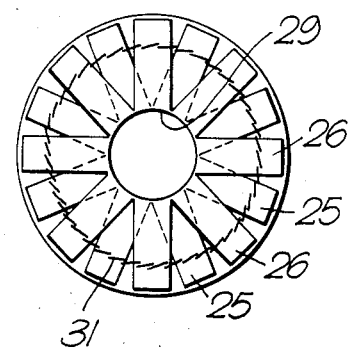
Figure 3D:
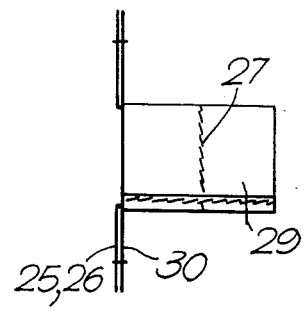
Figure 3E:
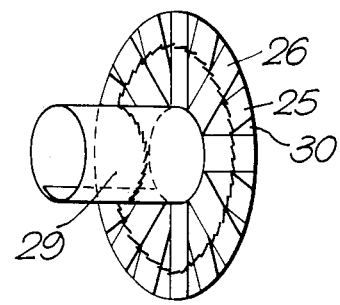

In the final step of the formation the sleeve portion 29 is pulled through so that the hem is now inside it, FIG. 3e.

Figure 4:
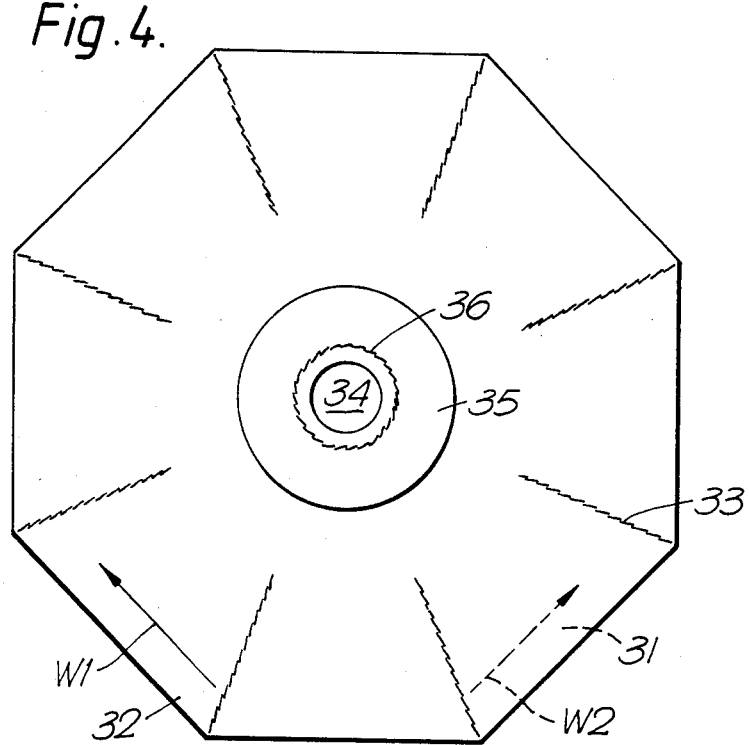
FIG. 4 shows an end closure of the bag.
Figure 5:
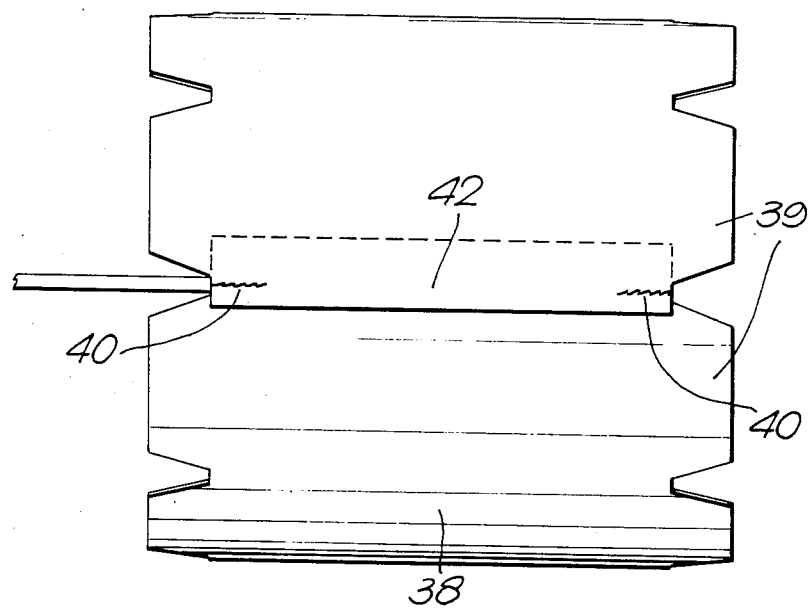
FIG. 5 shows the cylinder of the bag.

The next step to be described is making end closures of the bag. Each end closure consists of two polygonal sheets of fabric of coincident outline laid upon each other so that the warp direction W1 of one of the sheets 32 lies at an angle which is preferably 90° to the warp direction W2 of the other sheet 31. The two layers thus formed are stitched together along radial lines of stitching 33 into the corners of the polygon. In the end closure seen in FIG. 4, which is that which is going to receive the neck assembly, both layers 31,32 have a central aperture 34 which is surrounded by a reinforcing annulus of fabric 35 which is stitched to the layers by a circle of stitching 36. In the end closure which is to form the other end of the bag (the one to be remote from the column 10) the fabric layers 31,32 are uninterrupted by any aperture.

After the two layers have been attached together in that way, the neck assembly is mounted on them by having the sleeve portion 29, in the condition seen in FIG. 3e, inserted through the aperture 34 from that face of the end closure which is to be innermost in use. The annulus 35 on the interrupted end closure face is on the layer which is to be outermost in use.

Figure 6:
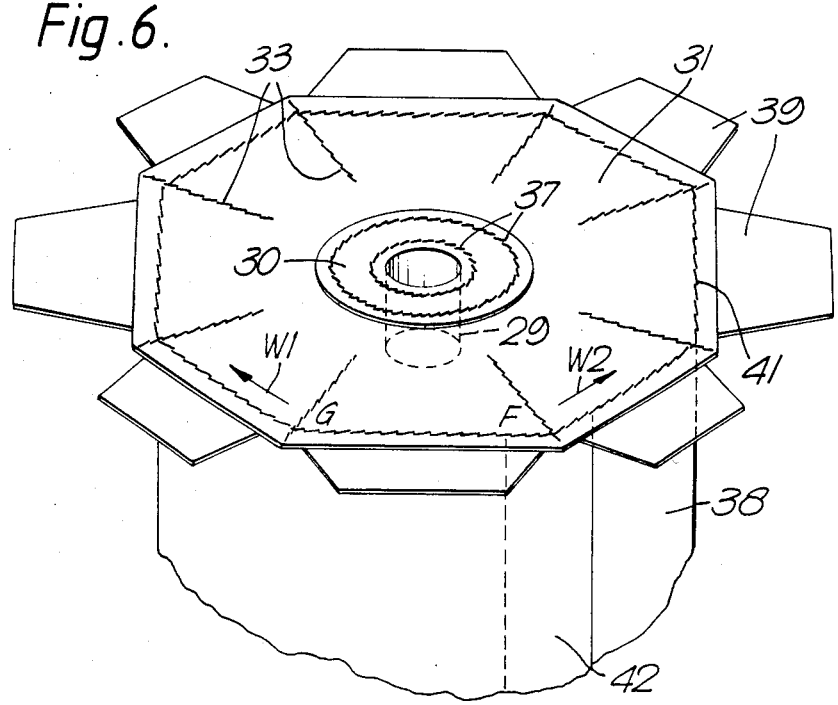
FIG. 6 shows an assembly stage.
Figure 7:
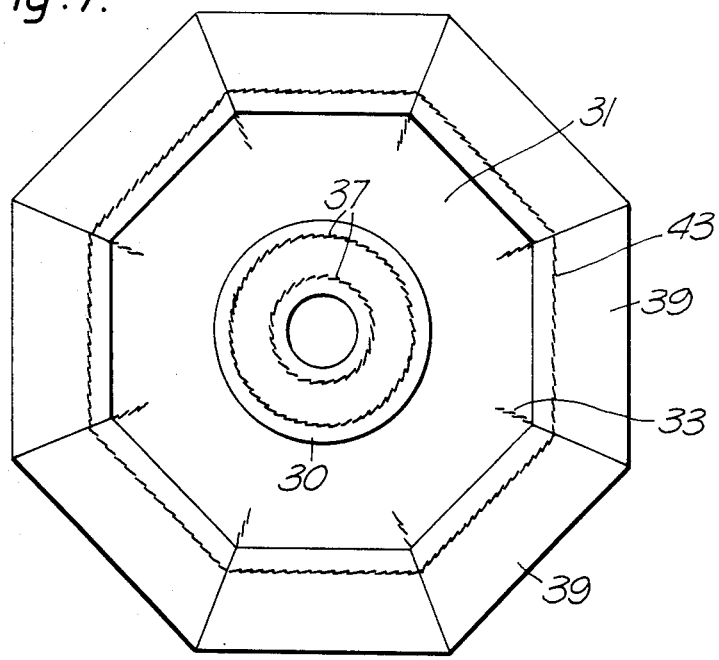
FIG. 7 shows a further assembly stage.
Figure 8:
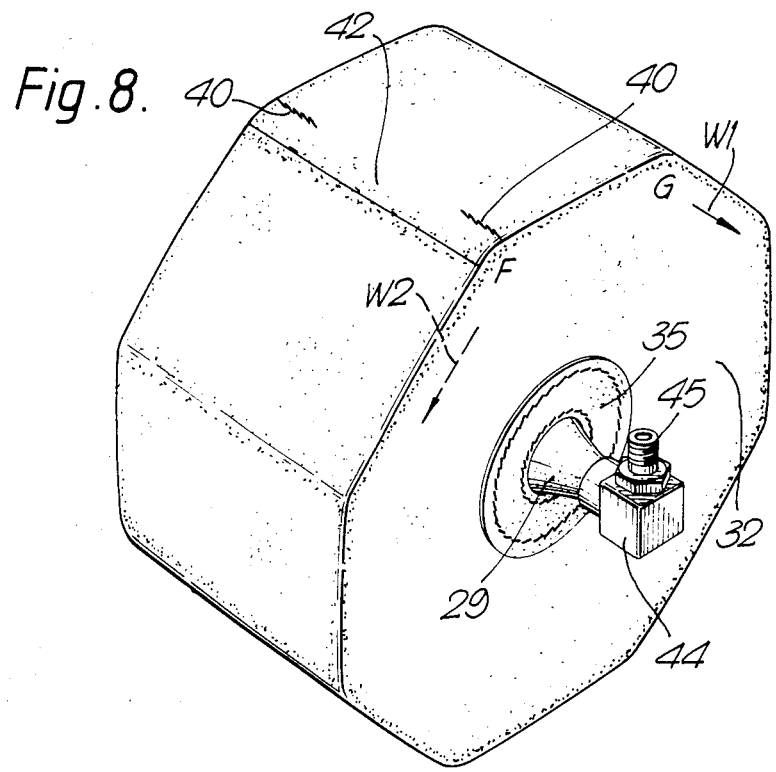
FIG. 8 shows a completed assembly.

The tongues 25,26 are therefore entrapped between the reinforcing annulus 30 and the inner of the two layers of the end closure. The neck assembly is then stitched to the end closure by a ring of stitching 37, FIG. 6, through to the reinforcing annulus 35.

Meanwhile, a hollow cylinder has been prepared from a rectangular blank of fabric 38 having at each major edge extensions which are to form flaps 39. The ends of the blank are brought round together and are overlapped to form a seam 42 and are tacked together at 40, at their end portions only. The sleeve thus formed is next secured to the end closures. In a first step a continuous line of stitching 41 (FIG. 6) is formed parallel to the polygonal edges of the end closure and along the line joining the roots of the end flaps 39 of the cylinder. It is important to note that the securing of the cylinder to the end closures is done in such a way that the seam 42 of the cylinder occurs within the angle between the two warps W1,W2. That is it could either be to the corner marked F or to the corner marked G in FIG. 6, or perhaps between those corners. The same disposition of warps W1,W2 is followed when securing the other of the end closures.

In a second stage of securing of the end closures the end flaps 39 are folded over the end closure and are stitched down onto it by a line of stitching 43 parallel to the edges of the end flaps spaced slightly in from those edges. It is very important that the folded over end flaps 39 shall be at the same tension as the underlying layers 31,32 of fabric of the end closure, so that all layers of fabric secured between the lines 41 and 43 of stitching are in equal tension and equally share any stresses to be experienced.

In a final stage of assembly the bag so formed is turned inside-out by eversion through the gap left along the seam 42 between the tackings 40 and its bladder is inserted into it through the same gap. The inflation neck of the bladder is brought out through the sleeve 29 which is now projecting outside the bag as a whole and is there united by means of standard fitments both with the sleeve and with a gas connector 44 having an inlet 45 which is at right angles to the axis of the bag in the sleeve. It is important that this inlet is orientated generally toward the seam 42 in the cylindrical sleeve, that is to be directed to within the angle formed between the warps W1 and W2 of the end closure.

Finally, the seam 42 is closed either by bonding or stitching. The dimensions of the bag are, of course, chosen in accordance with expected pressures in the duct and the diameter of the duct to be stopped-off and the dimension of the projecting neck and gas connector are selected in relation to the column 10 as has already been noted in connection with FIG. 2.

The fabric used for most of the structural parts is a plain nylon fabric but for the reinforcing annuli such as 30, 35 and also for one of the two parts 23, 24 polyurethane coated nylon is used. The stitching is found to involve least loss of strength if it is performed with round pointed "delta needles", that is to say needles of which at least the tip of the end portion is of triangular section.

Figure 9:
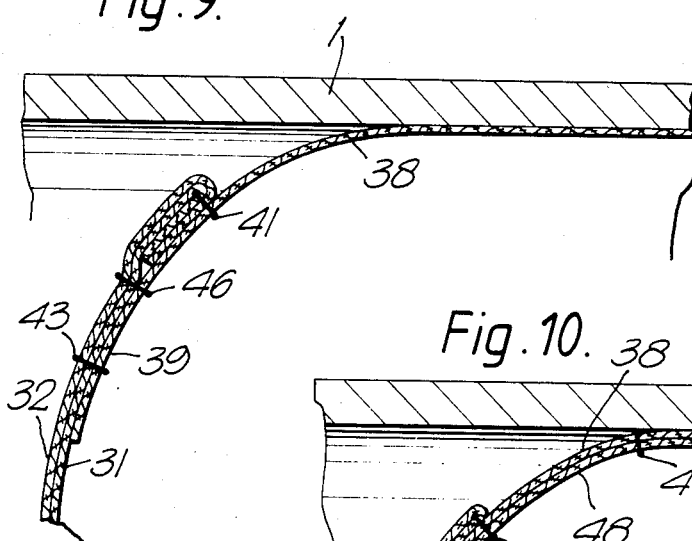
FIG. 9 shows a partial cross-section through the assembly as positioned in a duct.

FIG. 9 shows the conformation of the bag in use, at the important region where it parts from the wall 1 of the duct. The construction is as previously described except that an additional row of stitching 46 is shown which may advantageously be applied. This method of assembling the single bag 38 to the double end wall 31, 32 is preferred because of its manufacturing advantage but it does leave a region where only a single layer of fabric is resisting, unsupported, the pressures in the bag. This single layer region can usually be tolerated, as the radius of curvature of the fabric is high here and so the stresses induced are relatively low.

Figure 10:
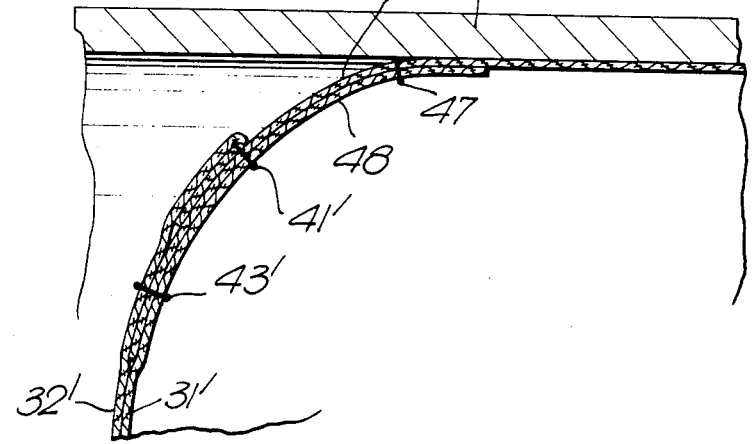
FIG. 10 is a similar cross-section but of a modified embodiment.

An alternative method of construction is shown in FIG. 10 where inner panel 31' is extended at the region 48 to underlie the bag 38 and is secured by a row of stitching 47. This has the advantage of doubling the fabric at the critical area but it is a much more complex method of fabrication.

It is possible for the bag to be inflated not with gas but with liquid, which is advantageous because of the incompressability of the liquid (leading to lower pressure stress in the free standing normal mode of the secondary bag before failure of the primary bag) and because of its high mass leading to high mechanical inertia of the bag.

What is claimed is:

1. Apparatus for sealing a pre-existing duct against fluid flow therein, said apparatus being adapted to be inserted radially into a pre-existing duct through holes provided for this purpose in the wall thereof and comprising:

a primary inflatable bag adapted to be inserted radially into said duct through a first hole of said holes in the wall of said duct, said primary inflatable bag having an upstream end and a downstream end and having an inflation opening at said upstream end thereof for introduction of an inflation fluid into said primary bag;

tube means for inflating said primary bag, said tube means being adapted to be inserted radially into said duct through said first hole of said holes and connected to said primary bag at said upstream end thereof for introduction of an inflation fluid through said inflation opening at said upstream end of said primary bag and into said primary bag to inflate said primary bag into sealing contact with said duct to seal said duct against fluid flow therein;

stop means adapted to be inserted radially into said duct through a second hold of said holes said stop means being located in a primary bag supporting position in a said duct, said position being downstream of said primary bag and located such that said stop means supports said downstream end of said primary bag when said primary bag is inflated into sealing contact with said duct;

a secondary inflatable bag adapted to be inserted radially into said duct through a third hole of said holes in the wall of a said duct downstream of said stop means, said secondary inflatable bag having an upstream end and a downstream end and having an inflation opening at said downstream end thereof for introduction of an inflation fluid into said secondary bag, said secondary bag being adapted to be inserted into said duct with said downstream end having said inflation opening oriented downstream in said duct and with said upstream end oriented upstream in said duct;

further tube means for inflating said secondary bag, said further tube means being adapted to be inserted radially into said duct through said third hole of said holes and adapted to be connected to said secondary bag at said downstream end thereof for introduction of an inflation fluid through said inflation opening and into said secondary bag to inflate said secondary bag into sealing contact with said duct to act as a seal for said duct in the event of a failure of the primary bag;

means for connecting said further tube means to said inflation opening of said secondary bag;

a tubular support member oriented radially in said duct through said third hole of said holes such that said tubular support member extends substantially fully diametrically across said duct, said tubular support member having an upstream face adapted to be positioned substantially co-planar with the downstream end of said secondary bag to support said secondary bag when said secondary bag is inflated into sealing contact with said duct;

means for securing said tubular support member in fixed position and extending substantially fully diametrically across said duct;

the distance, in the axial direction of said duct, from the location of said further tube means, when said further tube means is inserted radially into said duct and connected to said secondary bag, to said downstream end of said secondary bag when said secondary bag is inflated into sealing contact with said duct, being not substantially greater than a distance, in the axial direction of said duct, from said location of said further tube means to the upstream face of said tubular support member whereby, when said secondary bag is inflated in said duct, an upstream face of said tubular support member is substantially coplanar with the downstream end of said secondary bag; and the axial length of the area of the secondary bag adapted to contact the duct when said secondary bag is inflated in said duct being at least 0.7 times the diameter of the secondary bag.

2. Apparatus according to claim 1 wherein said secondary bag is hollow and comprises an inflation neck comprising said inflation opening, and wherein said member has an aperture therein accommodating said inflation neck.

3. Apparatus according to claim 1 wherein said further tube means is positioned in said tubular support member.

4. Apparatus according to claim 3 wherein the said axial length of said secondary bag is from 0.8 to 0.9 times the diameter thereof.

5. Apparatus for sealing a pre-existing duct against fluid flow therein, said apparatus being adapted to be inserted radially into a pre-existing duct through holes provided for this purpose in the wall thereof and comprising:

a primary inflatable bag adapted to be inserted radially into said duct through a first hole of said holes in the wall of said duct, said primary inflatable bag having an upstream end and a downstream end and having an inflation opening at said upstream end thereof for introduction of an inflation fluid into said primary bag;

tube means for inflating said primary bag, said tube means being adapted to be inserted radially into said duct through said first hole of said holes and connected to said primary bag at said upstream end thereof for introduction of an inflation fluid through said inflation opening at said upstream end of said primary bag and into said primary bag to inflate said primary bag into sealing contact with said duct to seal said duct against fluid flow therein;

stop means adapted to be inserted radially into said duct through a second hole of said holes, said stop means being located in a primary bag supporting position in a said duct, said position being downstream of said primary bag and located such that said stop means supports said downstream end of said primary bag when said primary bag is inflated into sealing contact with said duct;

a secondary inflatable bag adapted to be inserted radially into said duct through a third hole of said holes in the wall of said duct downstream of said stop means, said secondary inflatable bag having an upstream end and a downstream end and having an inflation opening at said downstream end thereof for introduction of an inflation fluid into said secondary bag, said secondary bag being adapted to be inserted into said duct with said downstream end having said inflation opening oriented downstream in said duct and with said upstream end oriented upstream in said duct, said secondary bag being constructed as a hollow cylinder of fabric with end closures constructed of a double layer of woven fabric, each layer of fabric including warps, the warps of the respective layer of each end being at an angle to each other, the end closure being secured to the hollow cylinder by means of folded-over end flaps of the hollow cylinder;

further tube means for inflating said secondary bag, said further tube means being adapted to be inserted radially into said duct through said third hole of said holes and adapted to be connected to said secondary bag at said downstream end thereof for introduction of an inflation fluid through said inflation opening and into said secondary bag to inflate said secondary bag into sealing contact with said duct to act as a seal for said duct in the event of a failure of the primary bag;

means for connecting said further tube means to said inflation opening of said secondary bag;

a support member oriented radially in said duct through said third hole of said holes such that said support member extends substantially fully diametrically across said duct, said support member having an upstream face adapted to be positioned substantially co-planar with the downstream end of said secondary bag to support said secondary bag when said secondary bag is inflated into sealing contact with said duct;

means for securing said support member in fixed position and extending substantially fully diametrically across said duct;

the distance, in the axial direction of said duct, from the location of said further tube means, when said further tube means is inserted radially into said duct and connected to said secondary bag, to said downstream end of said secondary bag when said secondary bag is inflated into sealing contact with said duct, being not substantially greater than a distance, in the axial direction of said duct, from said location of said further tube means to the upstream face of said support member whereby, when said secondary bag is inflated in said duct, an upstream face of said support member is substantially coplanar with the downstream end of said secondary bag; and the axial length of the area of the secondary bag adapted to contact the duct when said secondary bag is inflated in said duct being at least 0.7 times the diameter of the secondary bag.

6. Apparatus as defined in claim 5 in which the angle between the warps of the respective layers of each end closure is substantially equal to 90°.

7. Apparatus as defined in claim 5 in which one fabric layer of an end closure overlaps the hollow cylinder.

* * * * *